Aug. 11, 1931.  LE ROY A. WESTMAN ET AL  1,818,773
HYDRAULIC SHOCK ABSORBER
Filed Jan. 19, 1929  2 Sheets-Sheet 1
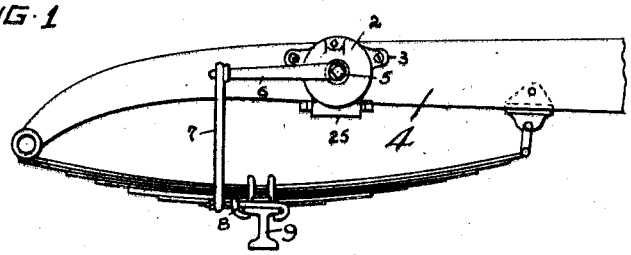
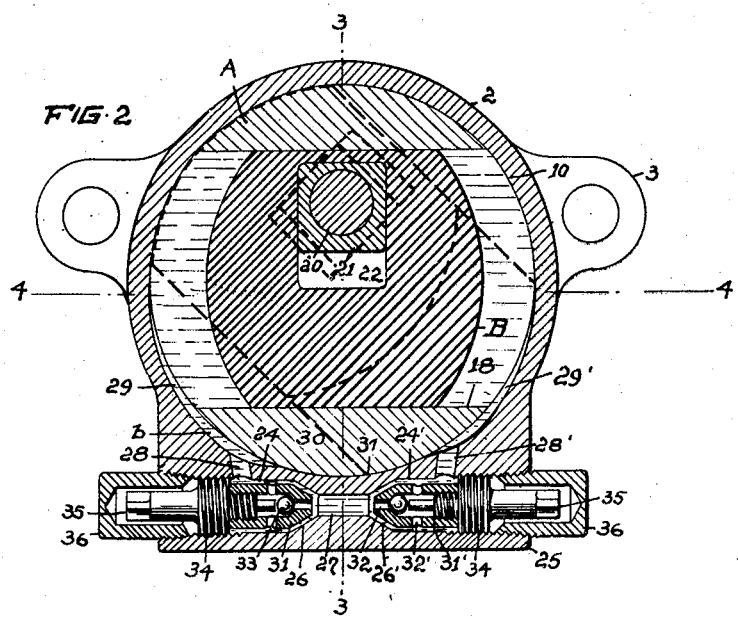
INVENTOR
GLENN B. CARMAN
LE ROY A. WESTMAN
ATTORNEYS Aug. 11, 1931.   LE ROY A. WESTMAN ET AL   1,818,773
HYDRAULIC SHOCK ABSORBER
Filed Jan. 19, 1929   2 Sheets-Sheet 2
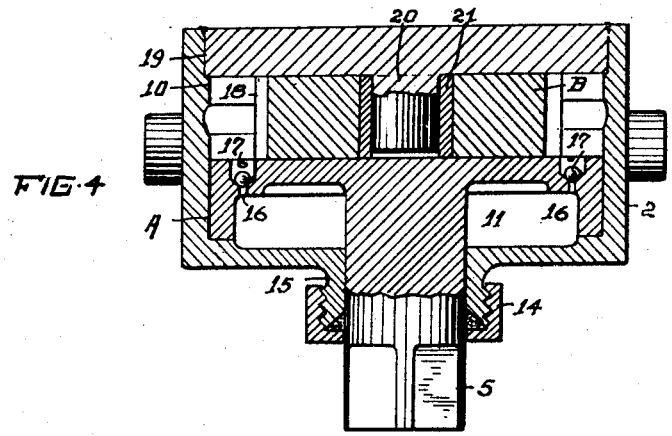
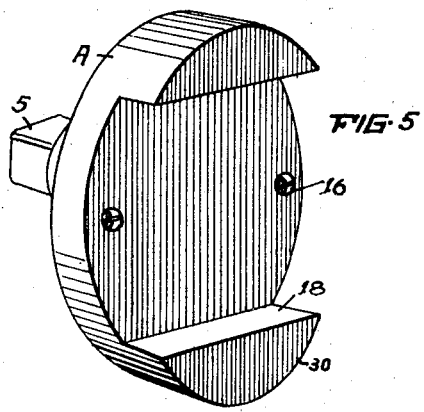
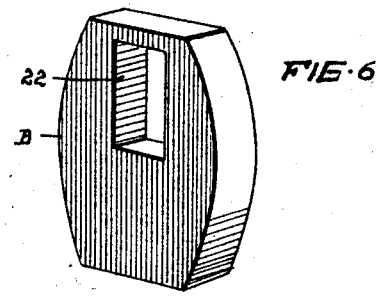
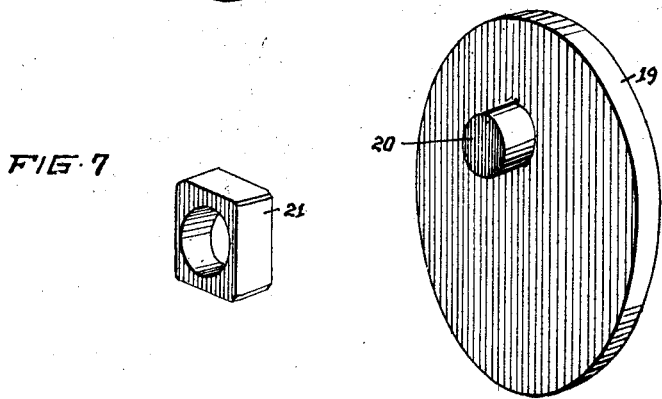
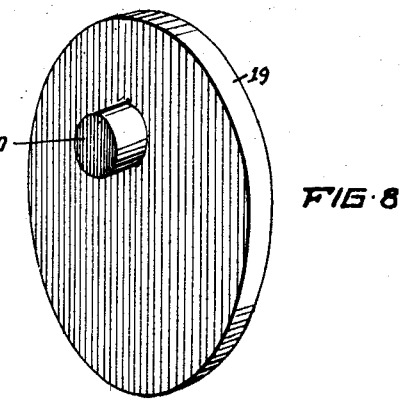
INVENTOR
GLENN B. CARMAN
LE ROY A. WESTMAN
BY
ATTORNEY Patented Aug. 11, 1931

1,818,773

UNITED STATES PATENT OFFICE

LE ROY A. WESTMAN AND GLENN B. CARMAN, OF CLEVELAND, OHIO

HYDRAULIC SHOCK ABSORBER

Application filed January 19, 1929. Serial No. 333,660.

Our invention relates to an improvement in hydraulic shock absorbers for vehicles, especially spring supported motor-driven vehicles, and the primary purpose of the invention is to provide an effective shock absorber of simple construction capable of producing variable double-acting results. Instrumental to the purpose we provide a pair of reciprocable and oscillatory members, together with a pair of adjustable liquid flow-restraining devices to cushion and dampen the vibratory movements which take place in a spring supported vehicle body when riding over uneven surfaces. The oscillatory member is utilized to operate the reciprocable member to force the liquid in opposite directions alternately through the restraining devices, and the rate of flow of the liquid is controlled partly by the positions assumed by the oscillatory member and partly by the predetermined settings of the said restraining devices, which are independently adjustable to permit different settings to be obtained for controlling the rate of flow of the liquid in opposite directions, either in equal or varying degree. Thus, the appliance may be set to act with greater cushioning and dampening effect in one direction than in the other direction, or with equal effect in opposite directions, all as hereinafter shown and more particularly described.

As an exemplification of a preferred form of the invention, reference may be had to the accompanying drawings, in which Fig. 1 is a side elevation of one of the devices attached to a vehicle body and its running gear, Fig. 2 an enlarged sectional view vertically through the device, and Fig. 3 a sectional view at right angles thereto on line 3—3 of Fig. 2 centrally of the device. Fig. 4 is a sectional view of the device on horizontal line 4—4 of Fig. 2. Fig. 5 is a perspective view of the channeled disk, Fig. 6 a perspective view of the piston, and Fig. 7 a perspective view of the pivotal block. Fig. 8 is a perspective view of the rear plate which carries the pivot pin or post for the block.

The device comprises a circular metal casing 2 having perforated ears or lugs 3 to permit it to be bolted to the side member 4 (or any other part) of the vehicle body or frame of the automobile. A short shaft 5 on a rotatable disk or oscillatory member A extends through the front wall of casing 2 to permit an operating arm or lever 6 to be attached thereto. The free end of lever 6 is connected by a link or rod 7 to a clip or other coupling member 8 attached to the axle 9. Accordingly, when relative movement occurs between the axle 9 and the body of the vehicle, an oscillatory movement is imparted to lever 6 thereby rotating shaft 5 alternately in opposite directions.

Member A which is affixed to or forms an integral part of shaft 5, is preferably in the form of a disk fitting snugly within a circular chamber 10 in casing 2. One side of the disk is dished or recessed to provide a wall or reservoir 11 for a liquid, such as oil or glycerine, which is introduced through a filling opening 12 in casing 2 when a screw plug 13 is removed. A suitable packing nut or gland 14 seals the joint where shaft 5 protrudes through the short screw-threaded extension 15 of casing 2, and the only escape for the liquid from reservoir 11 is through one or more outlet ducts 16 in disk A. Check valves 17 are confined within these ducts 16 which open into the bottom of a deep slot or channel 18 extending diametrically across the rear face of disk A. The opposite ends of channel 18 are closed by the circular wall of casing 2, and a plate 19 is welded or otherwise secured to the rear part of casing 2 to complete the closure for the open side of the channel. A round post or lug 20 is fixed to plate 19 where it will extend into the channel on the vertical median line of casing 2 in an eccentric or offset position in respect to the axis of disk A and its shaft 5.

Post 20 is a stationary part of the device and disk A rotates or oscillates in respect thereto, a movement which is imparted to a flat plate or piston B seated within channel 18. Thus, a square pivot block 21 is sleeved rotatably upon post 20, which block is slidably confined within a straight slot 22 in the plate or piston B which is shorter or of less length than channel 18 in disk A. Slot 22 is located midway of the ends of the plate or piston B and extends at right angles to the straight sides of the channel. As shown the opposite sides of the plate or piston B are rounded to conform to the circular wall of casing 2, but these ends may be straight if desired. In either case when the piston is in a neutral or central position within the channel, two liquid chambers of equal size are present at opposite ends of the piston, substantially as shown in Fig. 2. The liquid fills these chambers and all the openings and passages communicating therewith, and to permit the piston to move freely in either direction provision is made to permit the liquid to be transferred from one chamber to the other. Then by restraining or checking interflow of the liquid a cushioning action may be effected. This is accomplished by constructing the device as follows:

The base or bottom portion of casing 2 is formed with a straight boss or offset 25 containing a pair of axially-aligned by-pass openings 24—24′ which taper to smaller dimensions at their inner ends 26—26′ where connected together by a communicating passage or bore 27. Separate ports 28—28′ connect the by-pass openings 24—24′ with independent grooves 29—29′ extending upwardly equal distances at opposite points in the curved wall of chamber 10 in casing 2. Grooves 29—29′ diminish gradually in size or depth at their upper ends where they communicate with the open ends of channel 18 in disk A, and their lower ends terminate at the ports 28—28′ and are closed or cut off from each other by the curved segmental portion 30 of disk A which fits closely against the intervening wall 31 of casing 2. When the piston is in a neutral or central position in channel 18 the two chambers at opposite ends of the piston are in open communication with each other by way of the by-pass openings 24—24′ and the grooves 29—29′ and communication between them is maintained until the disk is rocked or rotated sufficiently in either direction to bring its segmental portion 30 in complete covering position, opposite one of the grooves 29 or 29′. However, as the grooves taper or diminish in size toward their upper ends the flow of the liquid is cut off gradually or in graduated degree, especially toward the end part of the stroke. This action merely supplements the main restraining effect on the interflow of the liquid achieved by other means consisting of a pair of tapered valve stems or liquid-flow restraining nipples 31—31′ located within by-pass openings 24—24′. The tapered ends of these nipples are stationed closely adjacent the tapered seats or inner ends 26—26′ of the by-pass openings, and in practice one tapered end is more closely set in respect to its seat than the other so that the flow of liquid is restrained in greater degree in one direction than the other, although both nipples may be adjusted and set to effect the same restraint in flow in opposite directions. Each nipple is also formed with a central end opening 32 and a side port 32′, and contains a ball or check valve 33 to permit free flow of the liquid in one direction through the nipple. Liquid flowing in the opposite direction closes valve 33 and the only escape for the liquid is then around the tapered outside end of the nipple. Therefore, when the liquid is being transferred from one piston chamber to the other, the liquid is restricted in its flow around one nipple and free to flow through the other, and in reversing the flow of the liquid, a reversal of the action takes place but the flow is restricted in different degree in case different settings are established between the two nipples and their respective seats. To permit such settings to be made independently each nipple is secured to the inner end of a screw member 34 having a wrench-engaging head 35 which may be conveniently reached when a screw plug 36 is removed from the outer end of the corresponding by-pass opening in boss 25.

In operation when the body and running gear of the vehicle move vertically in opposite directions the channeled disk is rotated correspondingly within casing 2, thereby rotating piston B around the same center. However, as the lug or post 20 is off center the piston is forced to slide toward one end of the channel within the disk, thereby expelling the liquid in advance of the piston. As this occurs one of the flow-restraining devices retards the transfer of the liquid from one end of the channel to the other and checks the movement occurring between the vehicle body and its running gear with cushioning or dampening effect. The return or reverse movement is also checked in the same way, but in different degree should the settings of the two valves differ. Accordingly the device is double-acting and may be readily adjusted and set to control the action of the vehicle springs in opposite directions and to absorb shock under varying conditions and requirements.

When the vehicle spring is under its normal load the parts are in a neutral position and the device offers very little restraint to the free movement of the spring within predetermined limits, and the degree of snubbing or checking movement at this time is controlled or regulated by the position or setting of the two valves. The adjustment of the valves is such that no abnormal checking will occur within the normal working play of the spring itself. However, when severe shock and rebound of the spring occurs, the disk will be rotated in substantial degree and caused to act as a valve itself, whereby transfer of the liquid will be cut off in gradually increasing degree until finally the flow is cut off altogether, say before the disk reaches the angle of approximately 45° relatively to its former or neutral position. This valve movement will be understood upon referring to Fig. 2, which shows the moving parts in a neutral position with a circular segmental bottom portion 30 of the disk overlapping and partly covering the widened portion or area—*b*—at the base of the graduated grooves 29—29'. In turning the disk in either direction the segmental portion 30 of the disk will cover or overlap one of the graduated grooves increasingly, thus narrowing the passage and cutting off the flow of the liquid in corresponding degree until the passage is closed altogether shortly before the limits of the turning movement is reached. Consequently the device acts with gradually increasing cushioning and dampening effect more or less proportionate to the needs or requirements of the vehicle spring or rebound movements of the vehicle body, while also dampening or cushioning the normal action of the spring in lesser degree and with double-acting effect.

What we claim, is:

1. A shock absorber, comprising a liquid receptacle, a rotatable disk within said receptacle and axially aligned therewith, a stationary post eccentrically related to the axis of said disk, a liquid displacement piston operatively connected with said disk and post, and means for restraining the flow of the liquid displaced within said receptacle by the piston.

2. A shock absorber, comprising a casing containing a liquid chamber, a pivot post extending into said chamber, a channeled disk rotatably mounted within said chamber opposite said post, a reciprocable piston mounted to slide within said channeled disk and connected with said post, a liquid transfer passage connecting the opposite ends of the channel in said disk, and means for restricting the flow of a liquid in at least one direction through said passage.

3. A shock absorber, comprising a chambered body, a rotatable disk and piston for displacing a liquid confined within said chambered body, said piston being supported to slide diametrically across said disk, an eccentric post and a pivot block sleeved thereon and slidably engaged by said piston and adjustable means for checking the displacement of liquid by the movements of said disk and piston.

4. A shock absorber, comprising a casing, a channeled disk and a slotted piston adapted to rotate together within said casing, an eccentric post having a pivot block in slidable engagement with said slotted piston, liquid by-pass passages between the opposite ends of the channel in said disk, and adjustable means for restricting the flow of liquid through said passages.

5. A shock absorber, comprising a casing, a disk and piston jointly rotatable within said casing, an eccentric device for translating the rotary movement of the piston into a reciprocable movement, means for permitting the transfer of a liquid from one end of the piston to the other during rotatable movements of the piston, and the rotatable movement of said piston being utilized to restrict the flow of the liquid with valved effect.

6. A shock absorber, including a casing, a rotatable disk within said casing axially aligned therewith, a liquid displacement piston, eccentric means co-acting with said disk for reciprocating said piston, and said disk also operating as a valve member to gradually restrict the amount of liquid displaced by the piston.

7. A shock absorber, comprising a circular chamber wall having circumferentially-extending grooves therein, a rotatable disk channeled across its face providing a segmental portion overlapping said grooves, a piston mounted within the channel in said disk, means for reciprocating said piston by oscillating said disk, a connecting passage for said grooves to permit the transfer of a liquid from one end of the channel to the other during oscillatory movements of the disk, and means for restricting the flow of liquid through said passage.

8. A shock absorber, including a circular chamber having a wall provided with a graduated groove, a rotatable disk circumferentially mounted with said chamber having a segmental portion adapted to close said groove by degrees during rotatable movement thereof, a liquid displacing piston carried by said disk, and means for reciprocating said piston during rotative movements of the disk.

9. A shock absorber, including a rotatable disk, a liquid displacing piston carried by said disk, eccentric means co-acting with said disk for reciprocating said piston, a liquid passage connecting the opposite ends of the piston, a tubular valve member for restricting the size of said passage, and a check valve within said valve member.

10. A shock absorber, including a casing, a rotatable disk within said casing, a reciprocable piston, eccentric means co-acting with said disk and slidably coupled with said piston to operate said piston, a liquid-passage open to opposite ends of said piston, and a pair of independently adjustable liquid-flow-restraining devices in said passage.

11. A shock absorber, including a rotatable disk, a reciprocable piston carried by said disk, eccentric means co-acting with said disk and slidably coupled with said piston to reciprocate said piston, a liquid passage between opposite ends of said piston, a pair of independently adjustable valve members for restricting the flow of liquid through said passage, and check valves associated with said valve members for controlling the flow of liquid in opposite directions through said passage.

12. A shock absorber, including a chambered body, a disk and piston jointly rotatable within said body, an eccentric device slidably coupled with said piston, said body containing liquid and transfer passages for the liquid, and separate valved members in said passages to restrict the flow of liquid through said passages, and said piston being double-acting and adapted to transfer the liquid in opposite directions alternately through said passages.

13. A shock absorber, including a liquid chamber, a disk and piston jointly rotatable in said chamber, a stationary post eccentrically related to the axis of said disk and slidably coupled with said piston, transfer passages in said body and tubular valve members containing check valves to control the flow of liquid forced by said piston alternately in opposite directions through said passages.

In testimony whereof we affix our signatures.

GLENN B. CARMAN.
LE ROY A. WESTMAN.